(12) United States Patent
Brizard et al.

(10) Patent No.: US 9,090,319 B2
(45) Date of Patent: Jul. 28, 2015

(54) AUTONOMOUS UNDERWATER VEHICLE FOR MARINE SEISMIC SURVEYS

(75) Inventors: Thierry Brizard, Massy (FR); Alice Herve, Paris (FR); Jonathan Grimsdale, Orsay (FR); Robert Dowle, Massy (FR)

(73) Assignee: Seabed Geosolutions AS, Laksevag (NO)

( * ) Notice: Subject to any disclaimer, the term of this patent is extended or adjusted under 35 U.S.C. 154(b) by 239 days.

(21) Appl. No.: 13/616,481

(22) Filed: Sep. 14, 2012

(65) Prior Publication Data

US 2013/0083624 A1 Apr. 4, 2013

Related U.S. Application Data

(60) Provisional application No. 61/541,211, filed on Sep. 30, 2011.

(51) Int. Cl.
*B63G 8/00* (2006.01)
*B63G 8/16* (2006.01)
*B63G 8/22* (2006.01)
(Continued)

(52) U.S. Cl.
CPC . *B63G 8/00* (2013.01); *B63C 11/42* (2013.01);
*B63G 8/08* (2013.01); *B63G 8/16* (2013.01);
*B63G 8/22* (2013.01); *G01V 1/38* (2013.01);
*G01V 1/3843* (2013.01);
(Continued)

(58) Field of Classification Search
CPC .............. B63G 8/00; B63G 8/08; B63G 8/14;
B63G 8/16; B63G 8/22; B63G 8/001; B63G
2008/002; B63G 2008/004; B63G 2008/005;
G01V 1/38; G01V 1/3808; G01V 1/3826;
G01V 1/3843; G01V 1/3852; B63C 11/42
USPC ............... 114/312, 333, 337, 338; 367/15–24
See application file for complete search history.

(56) References Cited

U.S. PATENT DOCUMENTS 5,253,605 A     10/1993  Collins
5,758,592 A *   6/1998   Benson, Jr. ................... 114/330
(Continued)

FOREIGN PATENT DOCUMENTS

CN        102213594 A      10/2011
EP        1217390 A1        6/2002
(Continued)

OTHER PUBLICATIONS

D. R. Yoerger, et al.; "Fine-scale seafloor survey in rugged deep-ocean terrain with an autonomous robot"; Robotics and Automation 2000, Proceedings, ICRA, International Conference on Apr. 24-28, 2000; Abstract; vol. 2; IEEE Eplore Digital Library; ISBN 0-7803-5886-4; Aug. 6, 2002; San Francisco, CA.
(Continued)

*Primary Examiner* — Ajay Vasudeva

(57) ABSTRACT

An autonomous underwater vehicle (AUV) for recording seismic signals during a marine seismic survey. The AUV includes a body having a flush shape; an intake water element located on the body and configured to take in water; at least one propulsion nozzle located on the body and configured to eject the water from the intake water element for actuating the AUV; at least one guidance nozzle located on the body and configured to eject water to change a traveling direction of the AUV; and a seismic payload located on the body of the AUV and configured to record seismic signals.

23 Claims, 14 Drawing Sheets

(51) Int. Cl.
  *G01V 1/38* (2006.01)
  *B63G 8/08* (2006.01)
  *B63C 11/42* (2006.01)

(52) U.S. Cl.
  CPC ....... *G01V 1/3852* (2013.01); *B63G 2008/004* (2013.01); *B63G 2008/005* (2013.01)

(56) References Cited

U.S. PATENT DOCUMENTS

| | | | |
|---|---|---|---|
| 5,894,450 | A | 4/1999 | Schmidt et al. |
| 6,390,012 | B1 | 5/2002 | Watt et al. |
| 6,474,254 | B1 | 11/2002 | Ambs et al. |
| 6,482,054 | B2 * | 11/2002 | Treaster et al. ................ 440/38 |
| 6,625,083 | B2 | 9/2003 | Vandenbroucke |
| 6,779,475 | B1 | 8/2004 | Crane et al. |
| 6,932,185 | B2 | 8/2005 | Bary et al. |
| 7,016,260 | B2 | 3/2006 | Bary |
| 7,124,698 | B1 * | 10/2006 | Shen et al. .................... 114/151 |
| 7,148,416 | B1 | 12/2006 | Rice |
| 7,252,046 | B1 | 8/2007 | Ead et al. |
| 7,796,466 | B2 | 9/2010 | Combee et al. |
| 7,965,583 | B2 * | 6/2011 | Thomas ......................... 367/16 |
| 8,025,021 | B2 | 9/2011 | Gosling |
| 8,096,254 | B1 | 1/2012 | Bauer et al. |
| 8,109,223 | B2 | 2/2012 | Jamieson |
| 8,576,658 | B2 | 11/2013 | Thomas |
| 8,677,921 | B2 | 3/2014 | Gosling |
| 8,717,844 | B2 * | 5/2014 | Welker et al. .................. 367/16 |
| 2010/0000459 | A1 | 1/2010 | Colangelo |
| 2010/0157727 | A1 | 6/2010 | Woodard, Jr. et al. |
| 2010/0182870 | A1 | 7/2010 | Norris et al. |
| 2010/0302901 | A1 | 12/2010 | Welker et al. |
| 2011/0297121 | A1 | 12/2011 | Kraus et al. |
| 2012/0057430 | A1 * | 3/2012 | Rouquette et al. ............. 367/24 |
| 2012/0069702 | A1 | 3/2012 | Muyzert et al. |

FOREIGN PATENT DOCUMENTS

| | | | |
|---|---|---|---|
| EP | 1319964 | A2 | 6/2003 |
| GB | 2041301 | A | 9/1980 |
| GB | 2163114 | A | 2/1986 |
| WO | 01/73477 | A2 | 10/2001 |
| WO | 0173477 | A2 | 10/2001 |
| WO | 2011/106237 | A2 | 9/2011 |
| WO | 2012/013171 | A1 | 2/2012 |
| WO | 2012/013962 | A1 | 2/2012 |
| WO | 2012085590 | | 6/2012 |
| WO | 2013041838 | | 3/2013 |
| WO | 2013045669 | A1 | 4/2013 |
| WO | 2013076488 | | 5/2013 |
| WO | 2013128187 | | 9/2013 |
| WO | 2013128188 | | 9/2013 |

OTHER PUBLICATIONS

Rhonda Duey; "'Flying' Nodes Shift Marine Seismic Paradigm'"; Dec. 1, 2011; pp. 1-2; [downloaded on Feb. 28, 2012 http://www.epmag.com/item/print/Flying-Nodes-Shift-Marine-Seismic-Paradigm-92689].

Tadahiro Hyakudome; "Design of Autonomous Underwater Vehicle"; Japan Agency for Marine-Earth Science and Technology (JAMSTEC), Japan; International Journal of Advanced Robotic Systems; vol. 8, No. 1 (2011) ISSN 1729-8806; pp. 122-130; [downloaded from http://www.intechopen.com/journals/international_journal_of_advanced_robotic_systems/design-of-autonomous-underwater-vehicle].

Hiroshi Yoshida, et al.; "New Attempts in the MR-X1 Sea-Trials: The Working AUV Tries to Survey of the Sea Floor and to Take Mud Samples"; Paper No. OMAE2010-20347; ASME 2010 29th International Conference on Ocean, Offshore and Arctic Engineering (MAE2010); Abstract; Jun. 6-11, 2010; Shanghai, China; [downloaded Feb. 28, 2012 at http://dx.doi.org/10.1115/OMAE2010-20347].

International Search Report in corresponding International Application No. PCT/EP2012/069144 mailed Feb. 4, 2013.

Written Opinion in corresponding International Application No. PCT/EP2012/069144 mailed Feb. 4, 2013.

International Search Report in corresponding International Application No. PCT/EP2012/069145 mailed Feb. 6, 2013.

Written Opinion in corresponding International Application No. PCT/EP2012/069145 mailed Feb. 6, 2013.

* cited by examiner

AUTONOMOUS UNDERWATER VEHICLE FOR MARINE SEISMIC SURVEYS

RELATED APPLICATION

The present application is related to, and claims priority from U.S. Provisional Patent Application No. 61/541,211, filed Sep. 30, 2011, entitled "AUTONOMOUS UNDERWATER VEHICLE FOR MARINE SEISMIC SURVEYS," the disclosure of which is incorporated herein by reference.

BACKGROUND

1. Technical Field

Embodiments of the subject matter disclosed herein generally relate to methods and systems and, more particularly, to mechanisms and techniques for performing a marine seismic survey using autonomous underwater vehicles (AUVs) that carry appropriate seismic sensors.

2. Discussion of the Background

Marine seismic data acquisition and processing generate a profile (image) of a geophysical structure under the seafloor. While this profile does not provide an accurate location of oil and gas reservoirs, it suggests, to those trained in the field, the presence or absence of these reservoirs. Thus, providing a high-resolution image of the geophysical structures under the seafloor is an ongoing process.

Reflection seismology is a method of geophysical exploration to determine the properties of earth's subsurface, which are especially helpful in the oil and gas industry. Marine reflection seismology is based on using a controlled source of energy that sends the energy into the earth. By measuring the time it takes for the reflections to come back to plural receivers, it is possible to evaluate the depth of features causing such reflections. These features may be associated with subterranean hydrocarbon deposits.

A traditional system for generating the seismic waves and recording their reflections off the geological structures present in the subsurface is illustrated in FIG. 1. A vessel 10 tows an array of seismic receivers 11 provided on streamers 12. The streamers may be disposed horizontally, i.e., lying at a constant depth relative to a surface 14 of the ocean. The streamers may be disposed to have other than horizontal spatial arrangements. The vessel 10 also tows a seismic source array 16 that is configured to generate a seismic wave 18. The seismic wave 18 propagates downwards toward the seafloor 20 and penetrates the seafloor until eventually a reflecting structure 22 (reflector) reflects the seismic wave. The reflected seismic wave 24 propagates upwardly until it is detected by the receiver(s) 11 on the streamer(s) 12. Based on the data collected by the receiver(s) 11, an image of the subsurface is generated by further analyses of the collected data.

The seismic source array 16 includes plural individual source elements. The individual source elements may be distributed in various patterns, e.g., circular, linear, at various depths in the water. FIG. 2 shows a vessel 40 towing two cables 42 provided at respective ends with deflectors 44. Plural lead-in cables 46 are connected to streamers 50. The plural lead-in cables 46 also connect to the vessel 40. The streamers 50 are maintained at desired separations from each other by separation ropes 48. Plural individual source elements 52 are also connected to the vessel 40 and to the lead-in cables 46 via ropes 54.

However, this traditional configuration is expensive as the cost of the streamers is high. New technologies deploy plural seismic sensors on the bottom of the ocean (ocean bottom stations) to improve the coupling. Even so, positioning the seismic sensors remains a challenge.

Other technologies use permanent receivers set on the sea bottom, as disclosed in U.S. Pat. No. 6,932,185, the entire content of which is incorporated herein by reference. In this case, the seismic sensors 60 are attached, as shown in FIG. 3 (which corresponds to FIG. 4 of the patent), to a heavy pedestal 62. A station 64 that includes the sensors 60 is launched from a vessel and arrives, due to its gravity, to a desired position. The station 64 remains on the bottom of the ocean permanently. Data recorded by sensors 60 are transferred through a cable 66 to a mobile station 68. When necessary, the mobile station 68 may be brought to the surface to retrieve the data.

Although this method provides a better coupling between the ocean bottom and the sensors, the method is still expensive and not flexible as the sensors and corresponding sensors are left on the bottom of the ocean. Further, positioning the sensors is not straightforward.

An improvement to this method is described, for example, in European Patent No. EP 1 217 390, the entire content of which is incorporated herein by reference. In this document, a sensor 70 (see FIG. 4) is removably attached to a pedestal 72 together with a memory device 74. After recording the seismic waves, the sensor 70 together with the memory device 74 are instructed by a vessel 76 to detach from the pedestal 72 and to surface at the ocean surface 78 to be picked up by the vessel 76.

However, this configuration is not very reliable as the mechanism maintaining the sensor 70 connected to the pedestal 72 may fail to release the sensor 70. Also, the sensor 70 and pedestal 72 may not achieve their intended positions on the seabed. Further, the fact that the pedestals 72 are left behind increase ocean pollution and the survey price, which are both undesirable.

Accordingly, it would be desirable to provide systems and methods that provide an inexpensive and non-polluting device for reaching the bottom of the ocean, recording seismic waves and resurfacing for data collection.

SUMMARY

According to one exemplary embodiment, there is an autonomous underwater vehicle (AUV) for recording seismic signals during a marine seismic survey. The AUV includes a body having a flush shape; an intake water element located on the body and configured to take in water when deployed underwater; at least one propulsion nozzle located at a tail or on a side of the body and configured to eject the water from the intake water element for actuating the AUV; at least one guidance nozzle located on the body and configured to eject water to change a travelling direction of the AUV; and a seismic payload located on the body of the AUV and configured to record seismic signals.

According to still another exemplary embodiment, there is an autonomous underwater vehicle for recording seismic signals during a marine seismic survey. The AUV includes a body having a smooth shape; a propulsion system located inside the body and having openings on a surface of the body for absorbing and ejecting water; a guidance system located inside the body and configured to change a position of a nose or a tail of the body while traveling underwater; and a seismic payload located on the body of the AUV and configured to record seismic signals.

According to yet another exemplary embodiment, there is a method for recording seismic data with a seismic sensor located on an underwater autonomous vehicle. The method includes a step of providing the AUV with a seismic sensor; a step of launching the AUV into water; a step of steering the AUV based on an inertial navigation and/or acoustic system to a desired seabed location; a step of recording the seismic data; a step of returning the AUV on a vessel; and a step of transferring the seismic data from the AUV to the vessel while on board of the vessel.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

Figure 1:
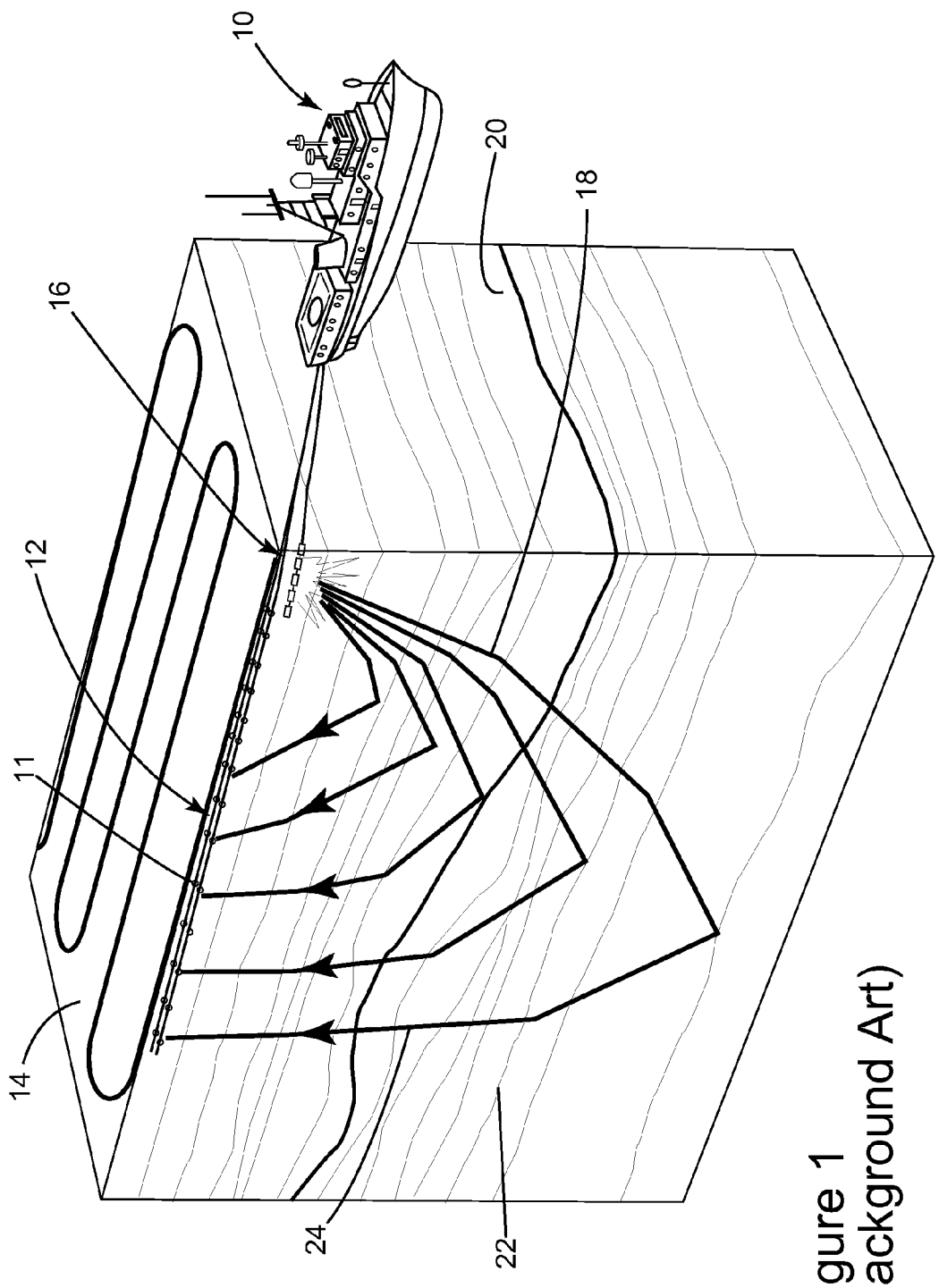
FIG. 1 is a schematic diagram of a conventional seismic survey system.
Figure 2:
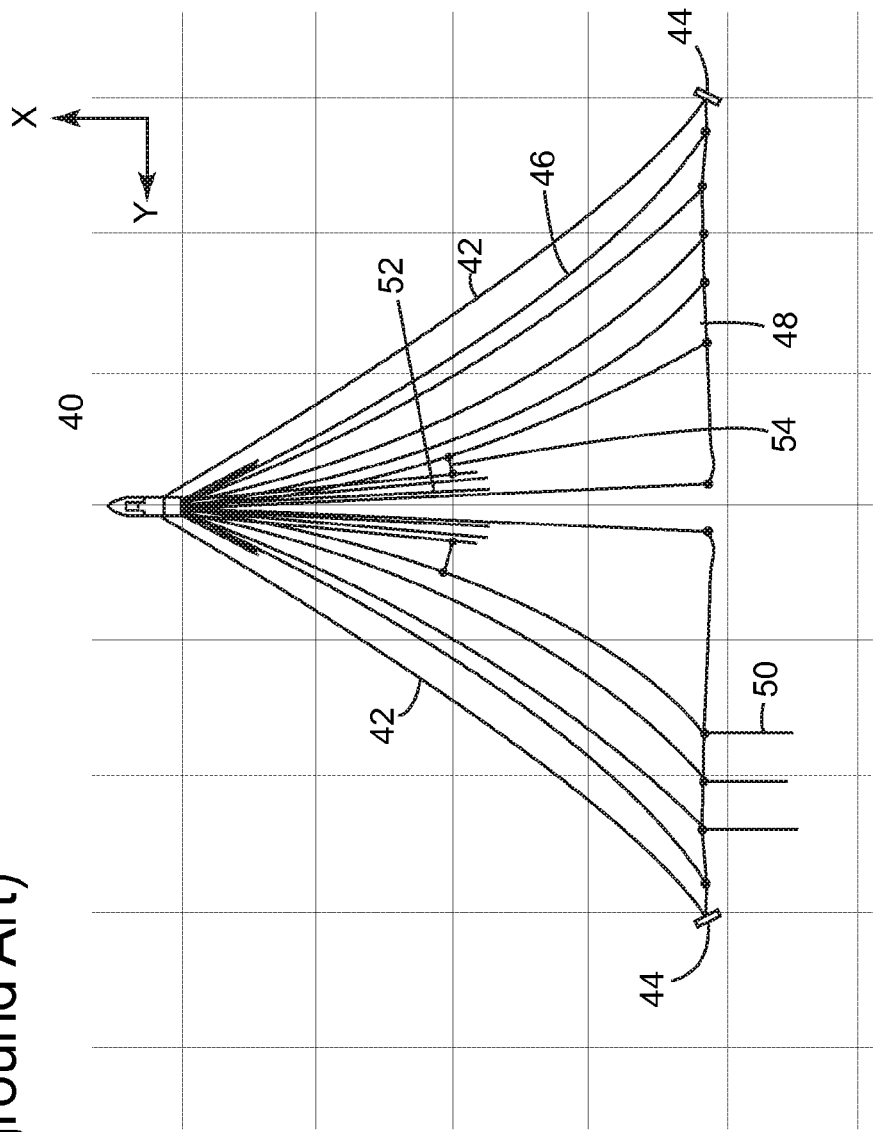
FIG. 2 illustrates a traditional arrangement of streamers and source arrays towed by a vessel.
Figure 3:
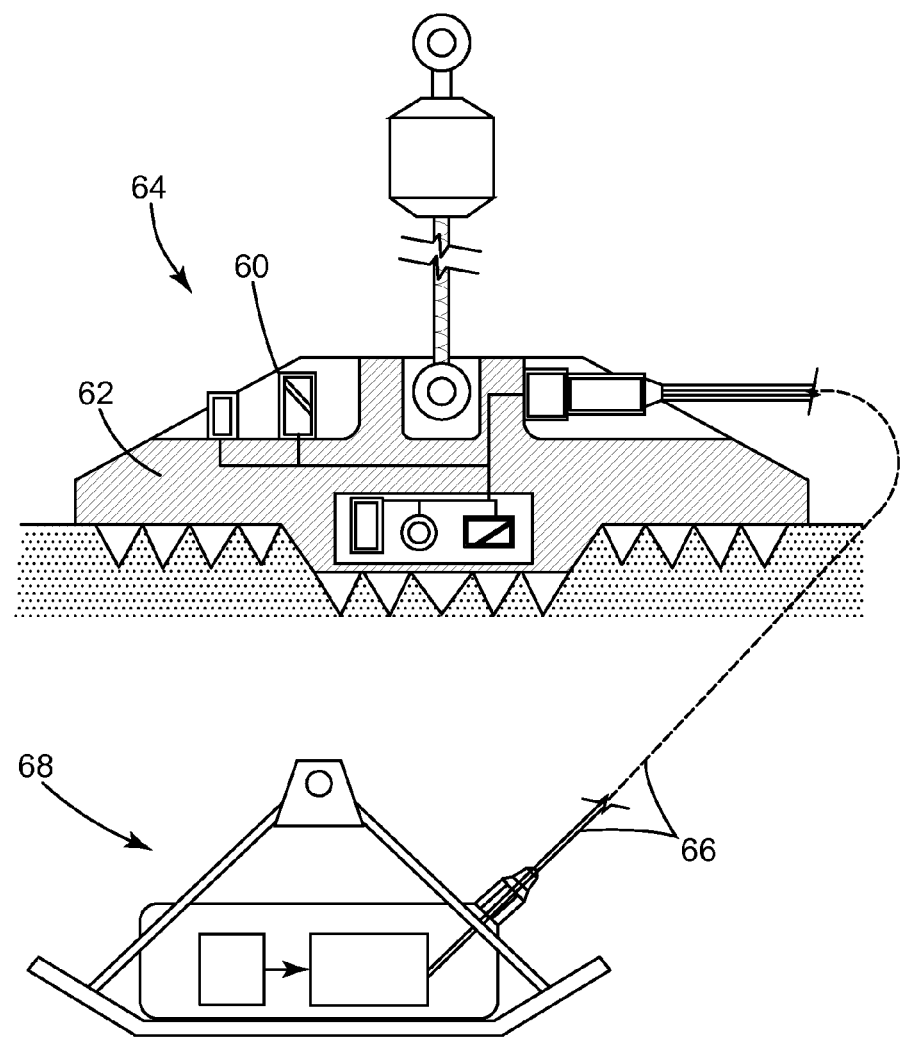
FIG. 3 is a schematic diagram of a station that may be positioned on the bottom of the ocean for seismic data recording.
Figure 4:
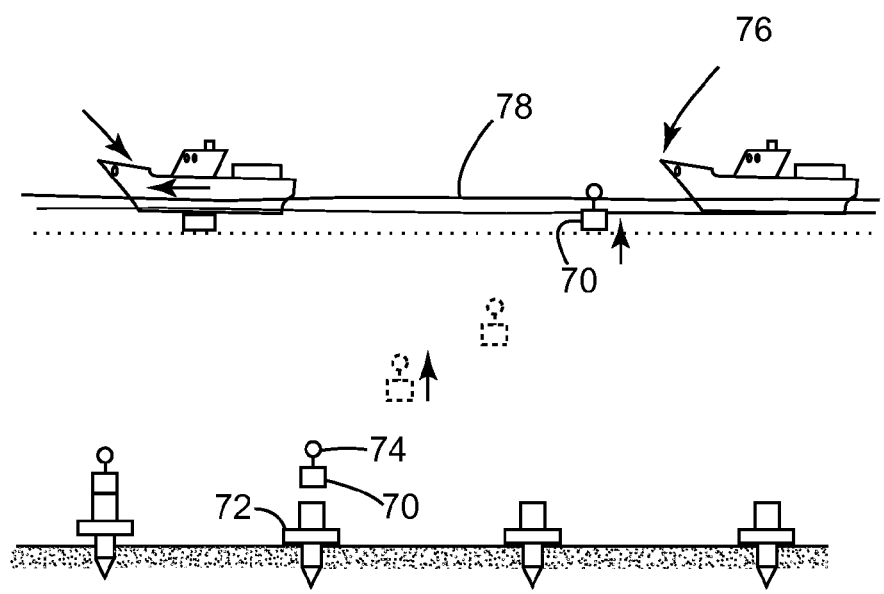
FIG. 4 is a schematic diagram of another station that may be positioned on the bottom of the ocean for seismic data recording.

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of an AUV having seismic sensors and being deployed from a deployment vessel. However, the embodiments to be discussed next are not limited to AUVs being deployed from a vessel, but may be applied to other platforms that may include seismic sensors.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Emerging technologies in marine seismic surveys need an inexpensive system for deploying and recovering seismic receivers at the bottom of the ocean. According to an exemplary embodiment, such a seismic system includes plural AUVs each having one or more seismic sensors. The seismic sensors may be one of a hydrophone, geophone, accelerometers, electromagnetic sensors, etc. If an electromagnetic sensor is used, then a source that emits electromagnetic waves may be used instead or in addition to an acoustic source.

The AUV may be a specially designed device or an off-the-shelf device so that it is inexpensive. The off-the-shelf device may be quickly retrofitted or modified to include the seismic sensors and necessary communication means to be discussed later. A deployment vessel stores the AUVs and launches them as necessary for the seismic survey. The AUVs find their desired positions using, for example, an inertial navigation system. Thus, the AUVs may be preprogrammed or partially programmed to find their desired positions. If the AUV are partially programmed, the final details for finding the desired position may be received, acoustically, from the vessel when the AUV is launched from the vessel. In the following, reference is made to a deployment vessel or a recovery vessel. It is noted that these vessels may be identical from an equipment point of view. However, the vessels may be operated as a recovery vessel or as a deployment vessel. In other words, a recovery vessel may be instructed, after having enough AUVs on board, to become a deployment vessel, and the other way around. When the document refers to a vessel, that might be the recovery vessel, the launching vessel or both of them.

As the deployment vessel is launching the AUVs, a shooting vessel may follow the deployment vessel for generating seismic waves. The shooting vessel may tow one or more seismic source arrays. The shooting vessel or another vessel, e.g., the recovering vessel, may then instruct selected AUVs to resurface so that they can be collected. In one embodiment, the deployment vessel also tows source arrays and shoots them as it deploys the AUVs. In still another exemplary embodiment, only the deployment vessel is configured to retrieve the AUVs. However, it is possible that only the shooting vessel is configured to retrieve the AUVs. Alternatively, a dedicated recovery vessel may wake-up the AUVs and instruct them to return to the surface for recovery.

In one exemplary embodiment, the number of AUVs is in the thousands. Thus, the deployment vessel is configured to hold all of them at the beginning of the survey and then to launch them as the seismic survey is advancing. If the shooting vessel is configured to retrieve the AUVs, when the number of available AUVs at the deployment vessel is below a predetermined threshold, the shooting vessel and the deployment vessel are instructed to switch positions in the middle of the seismic survey. If a dedicated recovery vessel is used to recover the AUVs, then the deployment vessel is configured to switch positions with the recovery vessel when the deployment vessel becomes empty. In another exemplary embodiment, both vessels are full with AUVs. The first one starts deploying the AUVs and the second one just follow the first one. Once the first one has deployed most or all the AUVs, this vessel becomes the recovery vessel and the second one starts deploying AUVs, thus becoming the deployment vessel. Later, the two vessel may switch functions as necessary.

In an exemplary embodiment, the seismic survey is performed as a combination of seismic sensors of the AUVs and seismic sensors of streamers towed by the deployment vessel, or the shooting vessel or by both of them.

In still another exemplary embodiment, when selected AUVs are instructed to surface, they may be programmed to go to a desired rendezvous point where they will be collected by the shooting vessel or by the deployment vessel or by the recovery vessel. The selected AUVs may be chosen to belong to a given row or column if a row and column arrangement is used. The shooting or/and deployment or recovery vessel may be configured to send acoustic signals to the returning AUVs for guiding them to the desired position. The AUVs may be configured to rise to a given altitude, execute the return back path at that altitude and then surface for being recovered. In one exemplary embodiment, the AUVs are configured to communicate among them so that they follow each other in their path back to the recovery vessel or they communicate among them to establish a queuing line for being retrieved by the shooting or recovery or deployment vessel.

Once on the vessel, the AUVs are checked for problems, their batteries may be recharged or replaced and the stored seismic data may be transferred to the vessel for processing. The recovery vessel may store the AUVs on deck during the maintenance phase or somewhere inside the vessel, e.g., inside of a module, closed or open, that is fixed on the vessel or the vessel's deck. A conveyor-type mechanism may be designed to recover the AUVs on one side of the vessel, when the vessel is used as a recovery vessel, and to launch the AUVs on another side of the vessel when the vessel is used as a deployment vessel. After this maintenance phase, the AUVs are again deployed as the seismic survey continues. Thus, in one exemplary embodiment the AUVs are continuously deployed and retrieved. In still another exemplary embodiment, the AUVs are configured to not transmit the seismic data to the deployment or recovery or shooting vessel while performing the seismic survey. This may be advantageous as the electric power available on the AUV may be limited. In another exemplary embodiment, each AUV has enough electric power (stored in the battery) to only be once deployed, record seismic data and resurface to be retrieved. Thus, reducing the data transmission amount between the AUV and the vessel while the AUV is underwater conserves the power and allows the AUV to be retrieved on the vessel before running out of power.

Figure 5:
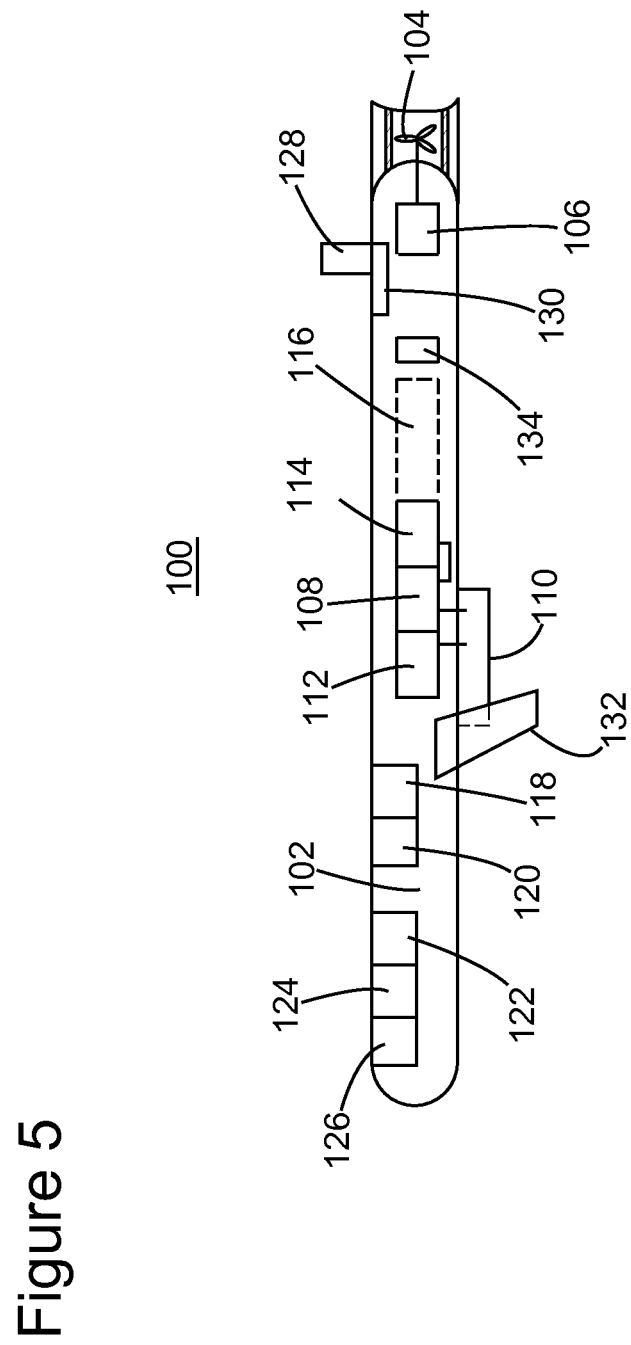
FIG. 5 is a schematic diagram of an AUV according to an exemplary embodiment.

The above-noted embodiments are now discussed in more detail with regard to the figures. FIG. 5 illustrates an AUV 100 having a body 102 to which one or more propellers 104 are attached. A motor 106 is provided inside the body 102 for activating the propeller 104. The motor 106 may be controlled by a processor 108. The processor 108 may also be connected to a seismic sensor 110. The seismic sensor 110 may have such a shape that when the AUV lands on the seabed, the seismic sensor achieves a good coupling with the sediments on the seabed. The seismic sensor may include one or more of a hydrophone, geophone, accelerometer, etc. For example, if a 4C (four component) survey is desired, the seismic sensor 110 includes three accelerometers and a hydrophone, i.e., a total of four sensors. Alternatively, the seismic sensor may include three geophones and a hydrophone. Of course other combinations of sensors are possible.

A memory unit 112 may be connected to the processor 108 and/or the seismic sensor 110 for storing seismic data recorded by the seismic sensor 110. A battery 114 may be used to power up all these components. The battery 114 may be allowed to change its position along a track 116 to change a center of gravity of the AUV.

The AUV may also include an inertial navigation system (INS) 118 configured to guide the AUV to a desired location. An inertial navigation system includes at least a module containing accelerometers, gyroscopes, or other motion-sensing devices. The INS is initially provided with the position and velocity of the AUV from another source, for example, a human operator, a GPS satellite receiver, another INS from the vessel, etc., and thereafter, the INS computes its own updated position and velocity by integrating (and optionally filtrating) information received from its motion sensors. The advantage of an INS is that it requires no external references in order to determine its position, orientation, or velocity once it has been initialized. Further, the usage of the INS is inexpensive.

Besides or instead the INS 118, the AUV may include a compass 120 and other sensors 122, as for example, an altimeter for measuring its altitude, a pressure gauge, an interrogator module, etc. The AUV 100 may optionally include an obstacle avoidance system 124 and a communication device 126 (e.g., wi-fi device) or other data transfer device that is capable to wirelessly transfer data. One or more of these elements may be linked to the processor 108. The AUV further includes an antenna 128 (which may be flush with the body of the AUV) and a corresponding acoustic system 130 for communicating with the deploying, recovery or shooting vessel. Stabilizing fins and/or wings 132 for guiding the AUV to the desired position may be used together with the propeller 104 for steering the AUV. The AUV may include a buoyancy system 134 for controlling a depth of the AUV and also not moving once the AUV has landed.

The acoustic system 130 may be an Ultra-short baseline (USBL) system, also sometimes known as Super Short Base Line (SSBL). This system uses a method of underwater acoustic positioning. A complete USBL system includes a transceiver, which is mounted on a pole under a vessel, and a transponder/responder on the AUV. A processor is used to calculate a position from the ranges and bearings measured by the transceiver. For example, an acoustic pulse is transmitted by the transceiver and detected by the subsea transponder, which replies with its own acoustic pulse. This return pulse is detected by the transceiver on the vessel. The time from the transmission of the initial acoustic pulse until the reply is detected is measured by the USBL system and is converted into a range. To calculate a subsea position, the USBL calculates both a range and an angle from the transceiver to the subsea AUV. Angles are measured by the transceiver, which contains an array of transducers. The transceiver head normally contains three or more transducers separated by a baseline of, e.g., 10 cm or less.

Figure 6:
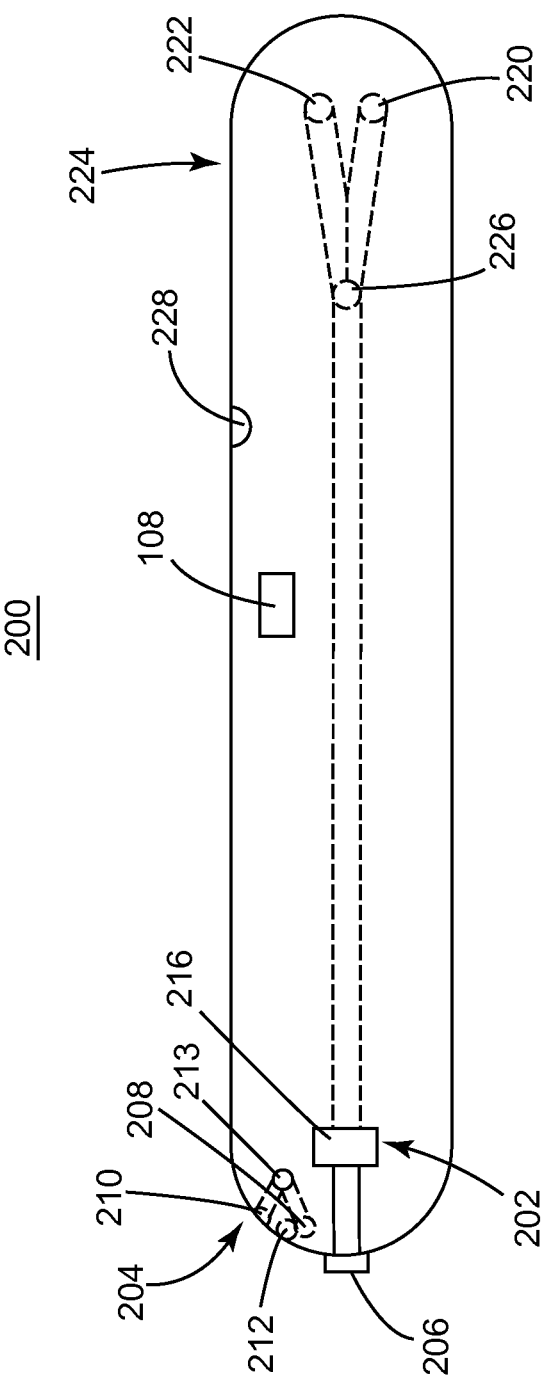
FIG. 6 is a schematic diagram of another AUV according to an exemplary embodiment.

FIG. 6 shows another AUV 200 that can be used for seismic surveys. The AUV 200 has a body 202 in the shape of a submarine. A water intake element 206 may be provided at a nose 204 of the AUV or at another part of the AUV. In addition, one or more guidance nozzles may be provided on the nose 204. FIG. 6 shows three guidance nozzles, one nozzle 210 located on top of the nose 204 and two nozzles 208 and 212 located on the sides of the nose 204. These guidance nozzles may be used to steer the AUV as needed. For example, an impeller or water pump 213 water may be provided inside the AUV for taking in water through the intake element or one of the guidance nozzles and then to expel the water through one or more of the guidance nozzles 208, 210 and 212 for changing the direction of the AUV based on momentum conservation. Another possibility is to have some valves instead of the water pump 213 that allow water entering the water intake element 206 to exit one or more of the guidance nozzles 208, 210 and 212 as desired. Those skilled in the art could imagine other mechanisms for steering the AUV.

In terms of propulsion, the AUV of FIG. 6 may have two propulsion nozzles 220 and 222 at a tail region 224. One or more than two nozzles may also be used. In one embodiment, a water pump 216 may be connected to the propulsion nozzles 220 and 222 for expelling the water through them. A valve 226 may be installed to control how much of the intake water is provided to each of the propulsion nozzles 220 and 222. Thus, it is possible to direct the entire water stream to only one propulsion nozzle. In another embodiment, instead of using the water intake element 206, another water intake element may be used, for example, a water intake element 228 located on the body 202 of the AUV. The pumps and valves are connected to the processor 108 so that control of the AUV can be achieved by the INS. Some or all the elements shown inside the AUV 100 in FIG. 5 may be present inside the AUV 200. In addition, the antenna 128, if present, is provided inside the body 202 of the AUV so that the AUV 200 is flush, i.e., it has no parts that stick out of the body 202.

Figure 7:
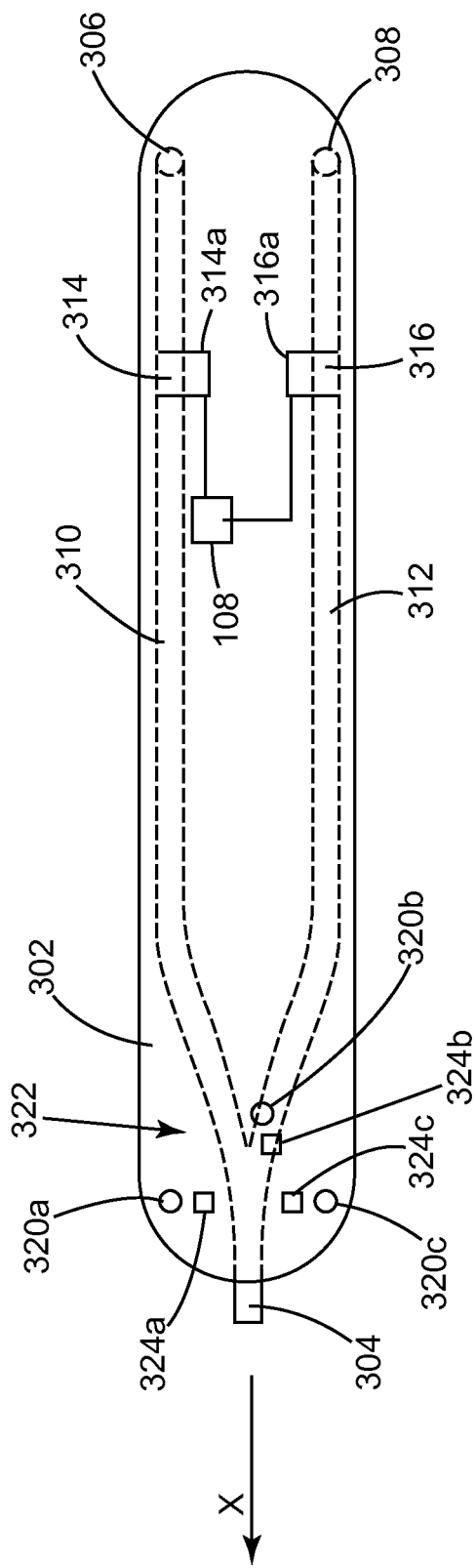
FIG. 7 is a schematic diagram of still another AUV according to an exemplary embodiment.

According to another exemplary embodiment illustrated in FIG. 7, an AUV 300 also has a submarine type body with no elements coming out of the body 302. For propulsion, the AUV 300 has a propulsion mechanism that includes an intake water element 304 and two propulsion nozzles 306 and 308. Appropriate piping 310 and 312 connects the intake water element 304 to the propulsion nozzles 306 and 308 through an inside of the AUV. Impellers 314 and 316 may be located in each pipe and connected to corresponding DC motors 314a and 316a, for forcing the water received from the intake water element 304 to exit with a controlled speed or volume at the propulsion nozzles 306 and 308. The two DC motors may be brushless motors and they may be connected to the processor 108 for controlling a speed of the impellers. The impellers may be controlled independently one from the other. Also, the impellers may be controlled to rotate in opposite directions (e.g., impeller 314 clockwise and impeller 316 counterclockwise) for increased stability of the AUV.

If this propelling mechanism is not enough for steering the AUV, guidance nozzles 320a-c may be provided on the bow part 322 of the AUV as shown in FIG. 7. The guidance nozzles 320a-c may be distributed on the sides or corners of a triangle that lays in a plane perpendicular to a longitudinal axis X of the AUV 300. One or three pump jets 324a-c may be also provided inside the body 302 for ejecting water through the guidance nozzles. In this way, a position of the bow of the AUV may be modified/changed while the AUV is moving through the water.

Figure 8:
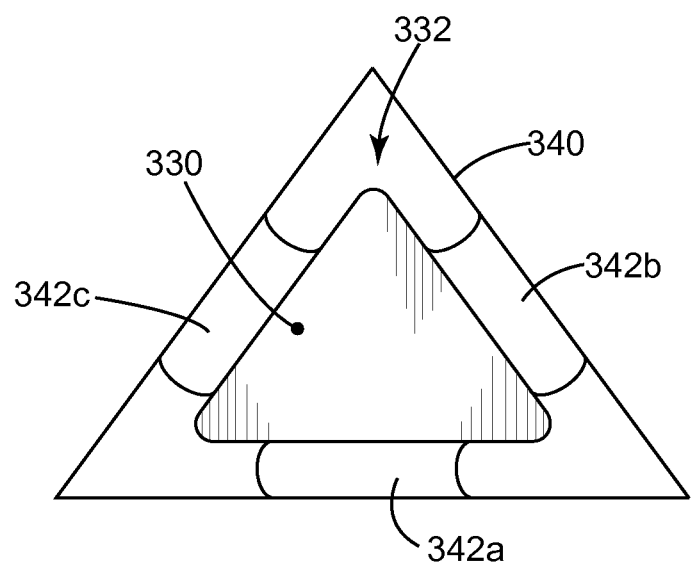
FIG. 8 is a cross-sectional view of an AUV according to an exemplary embodiment.

With regard to the shape of the AUV, it was noted above that one possible shape is the shape of a submarine. However, this shape may have various cross-sections. For example, a cross-section of the AUV may be circular. In one exemplary embodiment illustrated in FIG. 8, the cross-section of the AUV is close to a triangle. More specifically, FIG. 8 shows a triangle 330 having round corners 332. This shape (triangular-like shape) may be advantageous when deploying or recovering the AUV on the vessel. For example, the launching (and/or recovery) device 340 of the vessel may have a similar triangular shape and also rolling elements 342a-c that are configured to rotate such that the AUV is lifted from the water into the vessel or lowered from the vessel into the sea. The rolling elements 342a-c may be located on the launching device 340 so that there is enough contact with the AUV that the AUV does not slip downward when the rolling elements push the AUV upward. Other shapes may be imagined that could be handled by a launching device.

A communication between the AUV and a vessel (deployment, recovery, or shooting vessel) may take place based on various technologies, i.e., acoustic waves, electromagnetic waves, etc. According to an exemplary embodiment, an acoustic underwater positioning and navigation (AUPN) system may be used. The AUPN system may be installed on any one of the participating vessels and may communicate with the acoustic system 130 of the AUV.

The AUPN system may exhibit high accuracy and long range performance in both positioning and telemetry modes. These features are obtained due to the automatic beam forming transducers which focuses the sensitivity towards its targets or transponders. This beam can not only be pointed in any direction below the vessel, but also horizontally and even upwards to the surface as the transducer has the shape of a sphere.

Thus, AUPN is a hydro-acoustic Super Short Base Line—SSBL or USBL, tow tracking system, able to operate in shallow and deepwater areas to proven ranges in excess of 3000 meters. It is a multi-purpose system used for a wide range of applications including towfish and towed platform tracking, high accuracy subsea positioning and telemetry and scientific research.

The AUPN is used to determine the AUV position. In one embodiment, the actual AUV's position is measured with the AUPN and is then provided to the AUV, while moving to its desired position, to correct its INS trajectory.

Figure 9:
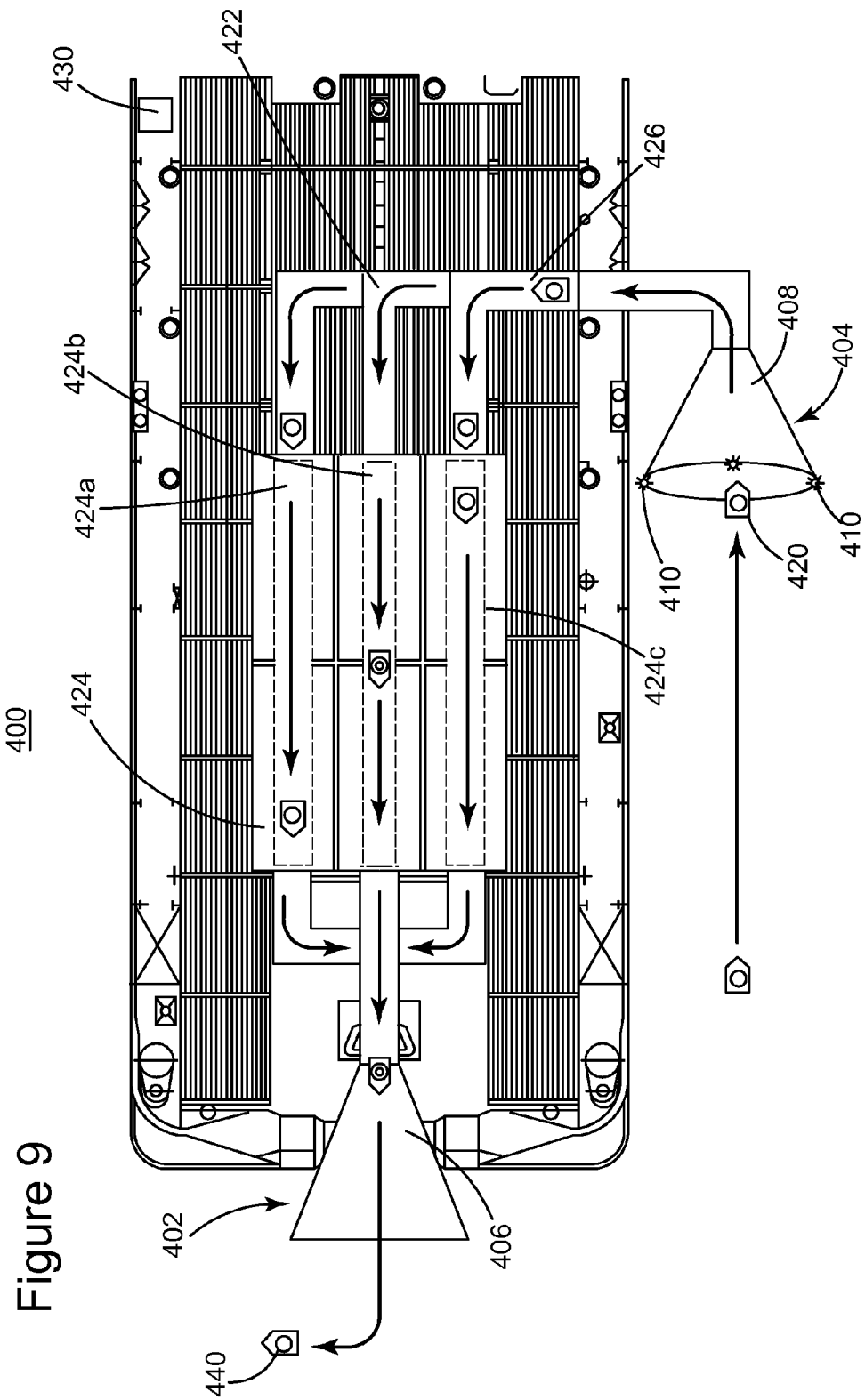
FIG. 9 is a schematic diagram of a vessel for deploying and/or recovering an AUV according to an exemplary embodiment.

A vessel for deploying and/or retrieving AUVs may be configured according to an exemplary embodiment illustrated in FIG. 9. A vessel 400 includes a deploying mechanism 402 and a recovery mechanism 404. Both the deploying and recovery mechanisms may include a corresponding chute 406 or 408. Considering the recovery mechanism 404, its chute 408 may have a funnel shape and may be deployed under water or at the surface water level. One or more beacons 410 may be located on a rim of the chute 408 for directing an AUV 420 inside the chute. After entering the chute 408, the recovered AUV 420 may engage a conveyor belt mechanism 422 or another hooking mechanism. The conveyor belt mechanism 422 may be configured to take the AUV 420 to a maintenance area 424. The maintenance area, inside the vessel 400, may have one or more parallel tracks 424a-c that split from a main track 426. Each track 424a-c takes corresponding AUVs 420 to appropriate maintenance locations.

At the maintenance locations, operators or robots may change or recharge the battery of the AUV, if depleted, and also may remove the memory unit of the AUV that stores the recorded seismic data. A new memory unit may be provided to the AUV. In an alternative embodiment, the memory is connected to a vessel memory unit 430 through a cable or a wireless interface and the data is transferred from the AUV's memory unit to the vessel's memory unit 430.

Once the maintenance phase is over, the AUVs 440 having fresh or recharged batteries and memory units with enough available space may be provided to the deploying mechanism 402 for deployment. Thus, a vessel 400 having the mechanisms noted above may, at the same time, retrieve AUVs 420 and deploy AUVs 440 for implementing various seismic surveys. Those skilled in the art would recognize that numerous modifications may be implemented for retrieving and deploying AUVs and those shown in the attached figures are for exemplary purposes.

Figure 10:
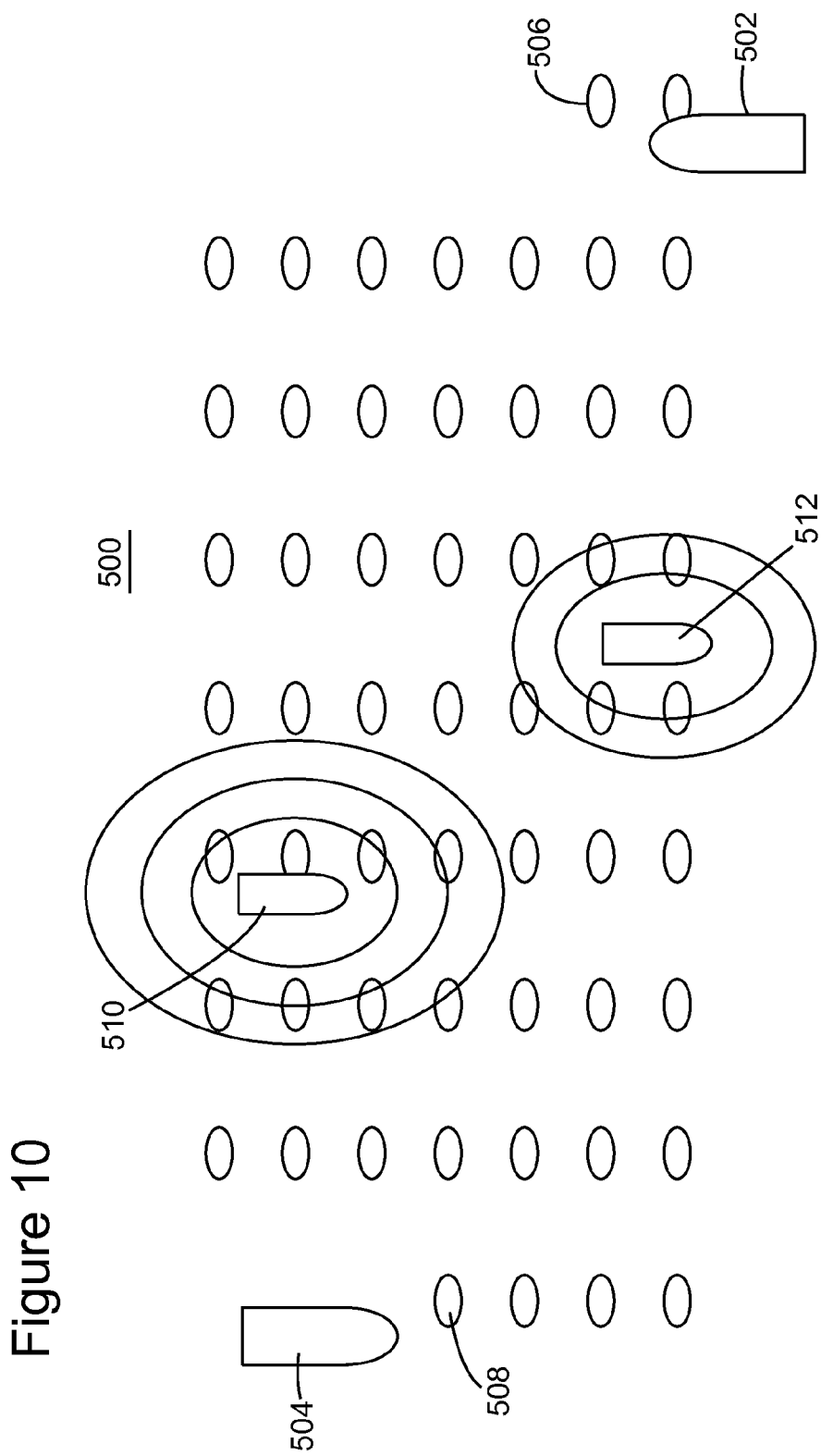
FIG. 10 is a schematic diagram of a process for deploying and recovering AUVs according to an exemplary embodiment.

Another embodiment for deploying and retrieving AUVs is now discussed with regard to FIG. 10. FIG. 10 shows a seismic system 500 that includes a deployment vessel 502 and a recovery vessel 504. The deployment vessel 502 is tasked to deploy AUVs 506 while the recovery vessel 504 is tasked to recover AUVs 508. In this embodiment, dedicated shooting vessels 510 and 512 follow their own path and generate acoustic waves. In one application, the deployment and recovery vessels do not tow source arrays. Although FIG. 10 shows two shooting vessels, those skilled in the art would appreciate that one or more than two shooting vessels may be used. In another application, the deployment and recovery vessels operate continuously. When the deployment vessel is empty, it switches positions with the recovery vessel. The shooting of the sources may continue while the deployment and recovery vessels switch positions.

The deploying and recovery processes discussed above are just some examples for illustrating the novel concepts of using AUVs for seismic data recording. Those skilled in the art would appreciate that these processes may be changed, adjusted, modified to fit various needs.

Figure 11:
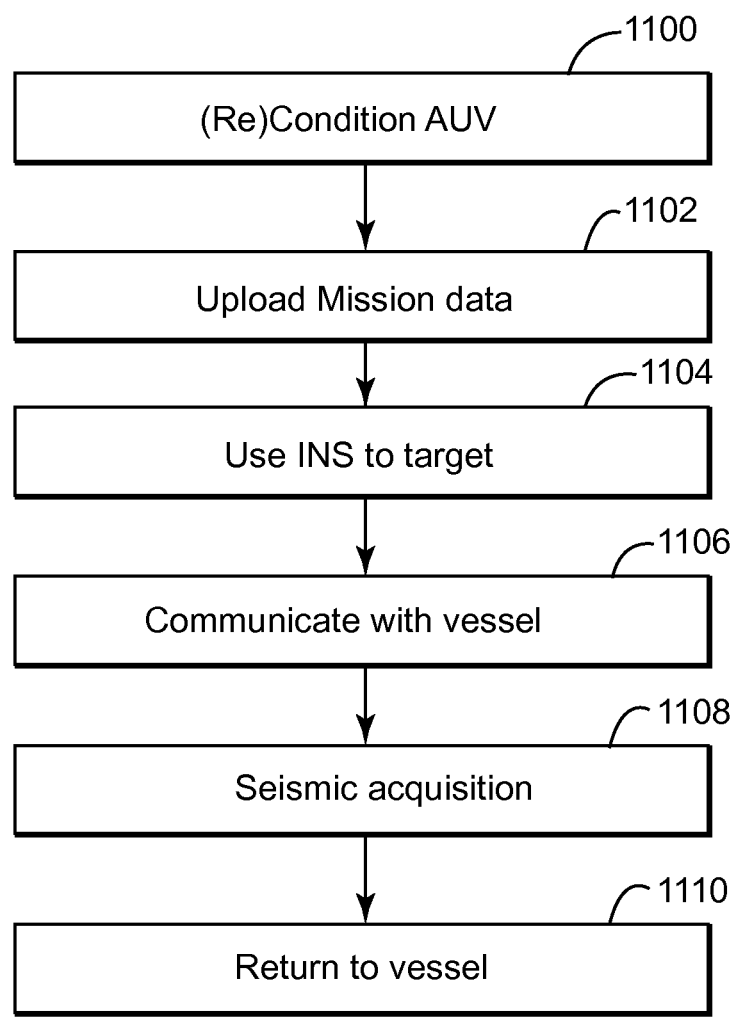
FIG. 11 is a flowchart of a method for recycling AUVs during a seismic survey according to an exemplary embodiment.

A method for deploying and recovering the AUVs is now discussed with regard to the flowchart presented in FIG. 11. In step 1100 the AUV is prepared for launching. This preparation phase, i.e., conditioning the AUV if launched for the first time or reconditioning the AUV if recycled, may include one or more of charging the batteries, downloading seismic data, checking the system, etc.

In the next step 1102, the mission data for that specific AUV is loaded in its processor. This step may take place while the AUV is on the deck of the vessel or the AUV is already loaded in its launching tube or ramp. The mission data may include the present position of the AUV, the final desired position on the bottom of the ocean, and other parameters. After this step, the AUV is launched in step 1104. The AUV is configured to use its INS (or acoustic communication or INS combined with acoustic communication) and the uploaded mission data to travel to its final destination. In one application, the AUV does not receive any information from the vessel while travelling. However, in another application, the AUV may receive additional information from the vessel, for example, its current position as measured by the AUPN of the vessel. In still another application, beacons may be used to guide the AUV. In still another application, some of the already deployed AUV may function as beacons.

In step 1106, after the AUV have settled to the seabed, the vessel interrogates the AUV about its position. The AUV responds by sending a reference beam and the AUPN of the vessel determines the position of the AUV. The position of the AUV may be determined with an accuracy of, for example, +/−2 m when the AUV is at a depth not larger than 300 m. Alternately, step 1106 may be performed between steps 1104 and 1108, or between steps 1108 and 1110 or at the beginning of step 1110 or both.

After this step, the AUV is ready to record seismic signals in step 1108. This process may last as long as necessary. In one application, after the shooting vessel has triggered its source arrays in a predetermined vicinity of the AUV, the AUV is instructed in step 1110, for example, using the AUPN of the recovery vessel to wake-up and start resurfacing. During this step the AUV starts its motor and moves towards the recovery vessel (the AUV can move in the direction of the recovery catcher, but the relative speed will be high, thus, the AUV may also move in the same direction as the boat, but slower, so that the relative speed is more reasonable, and the AUV can actively position itself to be catched by the catcher when the time is proper). In one application, the recovery vessel is the same with the deployment vessel. The AUV is helped to arrive at the recovery vessel by acoustic signals emitted by the recovery vessel. Once the AUV arrives at the recovery vessel, the AUV engages the recovery unit (e.g., chute) of the recovery vessel and the AUV is handled to arrive on the deck of the vessel for reconditioning as described in step 1100. The AUV may also be delivered under the deck of the recovery vessel for the reconditioning (maintenance) phase or in a back deck handling module fixed on the deck. Then, the whole process may be repeated so that the AUVs are constantly reused undersea for the seismic survey.

Figure 12:
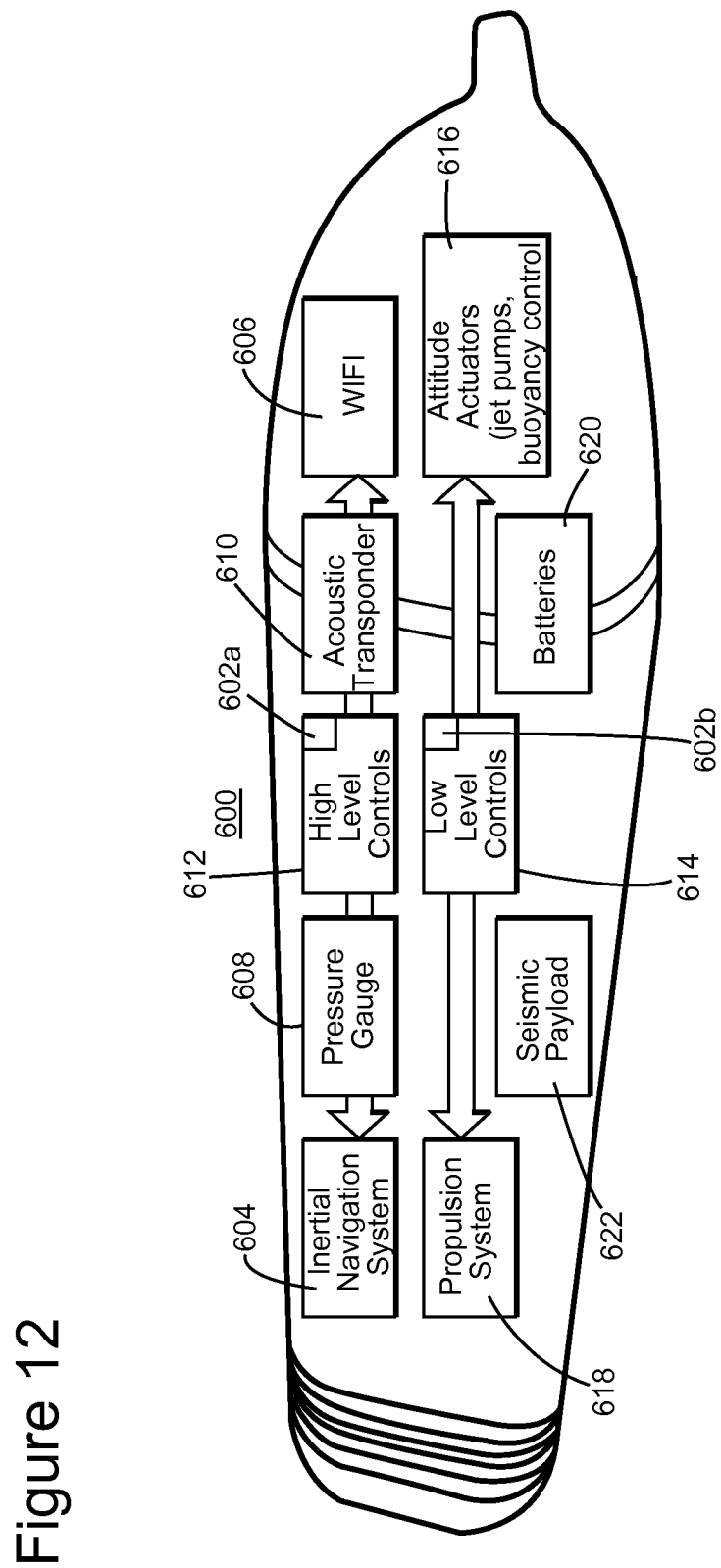
FIG. 12 is a schematic diagram of an AUV according to another exemplary embodiment.

With regard to the internal configuration of the AUV, a possible arrangement is shown in FIG. 12. FIG. 12 shows an AUV 600 having a CPU 602a that is connected to INS 604 (or compass or altitude sensor and acoustic transmitter for receiving acoustic guidance from the mother vessel), wireless interface 606, pressure gauge 608, transponder 610. The CPU 602a may be located in a high level control block 612. The INS is advantageous when the AUV's trajectory has been changed, for example, because an encounter with an unexpected object, e.g., fish, debris, etc., because the INS is capable to take the AUV to the desired final position as it does for currents, wave motion, etc. Also, the precision of the INS may be high. For example, it is expected that for a target having a depth of 300 m, the INS is capable to steer the AUV within +/−5 m of the desired target location. However, the INS may be configured to receive data from the vessel to increase its accuracy. It is noted that the AUV 600 may reach a depth of 300 m. A CPU 602b, in addition to the CPU 602a, is part of a low level control module 614 that is configured to control attitude actuators 616 and the propulsion system 618. One or more batteries 620 may be located in the AUV 600. A seismic payload 622 is located inside the AUV for recording the seismic signals. Those skilled in the art would appreciate that more modules may be added to the AUV. For example, if a sensor is provide outside the body of the AUV, a skirt may be provided around or next to the sensor. A water pump may pump water from the skirt to achieve a suction effect so that a good coupling between the sensor and the seabed is achieved. However, there are embodiments where no coupling with the seabed is desired. For those embodiments, no skirt is used.

Figure 13:
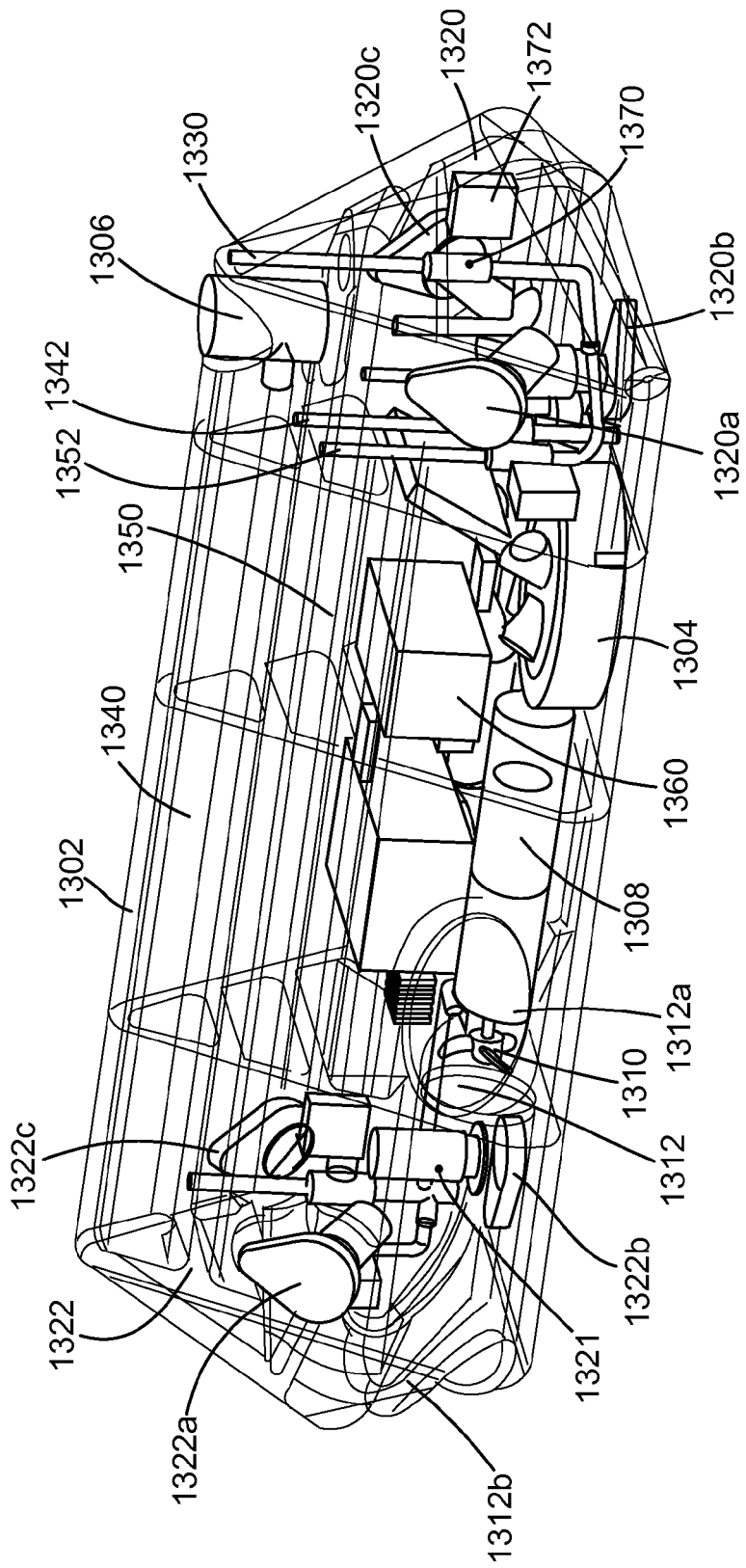
FIG. 13 is a schematic diagram of an AUV according to still another exemplary embodiment.

According to an exemplary embodiment, during the process of deploying or retrieving the AUV, various chambers of the AUV may be flooded or not with water so that a buoyancy of the device is modified accordingly. For example, FIG. 13 shows an AUV 1300 having a body 1302 with a triangular-like shape. The body may be shaped differently. The body 1302 includes a payload 1304 (e.g., seismic sensors as discussed above) and an acoustic transceiver 1306 that may partially extend outside the body 1302. The acoustic transceiver 1306 is configured to communicate with the vessel and receive acoustic guidance while traveling towards a desired target point. Alternatively, an INS may be used for guidance. Many of the devices discussed in the above embodiments may be present in the body but are neither shown nor discussed with regard to this figure for simplicity.

FIG. 13 also shows a motor 1308 configured to rotate a propeller 1310 for providing thrust to the AUV 1300. One or more motors and corresponding propellers may be used. The propeller 1310 receive water trough a channel 1312 formed into the body 1302. The channel 1312 has two openings 1312a (intake water element) and 1312b (propulsion nozzle) that communicate with the ambient water. The two openings may be located on the nose, tail or sides of the body 1302.

Guidance nozzles or turbines may be provided at a nose 1320 and/or at a tail 1322 of the body 1302 for rotation and/or translation control. For simplicity, the guidance nozzles and the turbines are identified by the same reference numbers and are used interchangeable herein although FIG. 13 shows actual turbines. Three guidance nozzles 1320a-c may be located at the nose 1320 and three guidance nozzles 1322a-c may be located at the tail 1322 of the body 1302. The nozzles are connected by piping to corresponding water pumps 1321. If turbines are used instead of nozzles, no piping and no water pumps are necessary. These water pumps may be used to take in water through various vents (not shown) and guide the water thorough one or more of the guidance nozzles at desired speeds. Alternatively, the water pumps may take in the water at one guidance nozzle and expel the water at the other nozzle or nozzles. Thus, according to this exemplary embodiment, the AUV has the capability to adjust the position of its nose with the guidance nozzles (or turbines) 1320a-c and the position of its tail with the guidance nozzles (or turbines) 1322a-c. However, in another embodiments, only the tail nozzles or only the nose nozzles may be implemented.

FIG. 13 also shows one or more chambers 1340 and 1350 that communicate through piping 1342 and 1352 and vents 1330 with the ambient water so that the chambers may be flooded when desired. A control unit 1360 may instruct the water pump to provide water into one or more of the chambers 1340 and 1350 (to partially or fully flood them) so that a buoyancy of the AUV becomes neutral or negative. The same control unit 1360 can instruct the water pump (or use another mechanism) to discharge the water from the one or more chambers so that the buoyancy of the AUV becomes positive. Alternatively, the control unit 1360 instructs one or more actuators 1370 to fluidly connect the vent 1330 to the flooding chamber for making the buoyancy of the AUV negative. For making the buoyancy positive, the control unit 1360 instructs an accumulator 1372 to provide compressed gas (e.g., air, $CO_2$, etc.) to the flooding chambers to expel the water and then the actuator 1370 seals closed the emptied flooding chambers.

Figure 14:
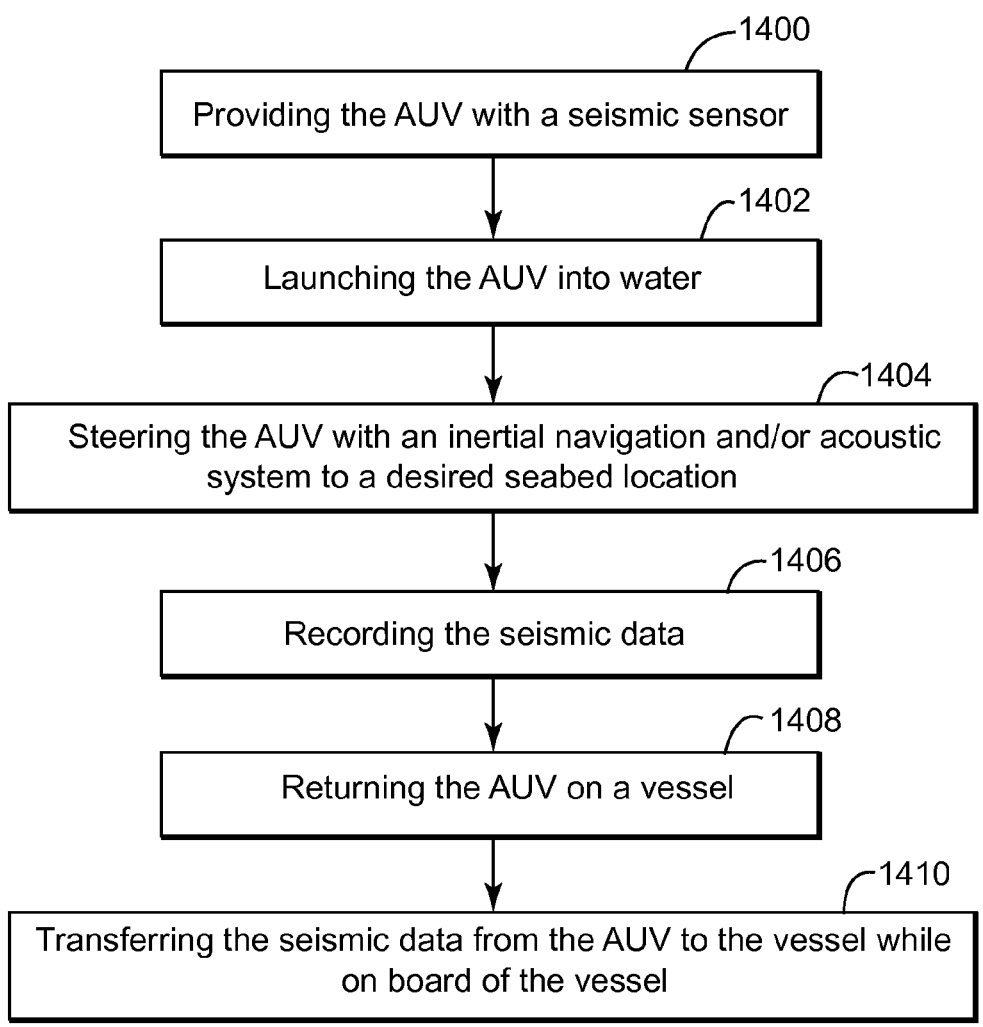
FIG. 14 is a flowchart of a method for deploying and recovering an AUV during a seismic survey.

According to an exemplary illustrated in FIG. 14, there is a method for recording seismic data with a seismic sensor located on an underwater autonomous vehicle. The method includes a step 1400 of providing the AUV with a seismic sensor, a step 1402 of launching the AUV into water, a step 1404 of steering the AUV with an inertial navigation and/or acoustic system to a desired seabed location, a step 1406 of recording the seismic data, a step 1408 of returning the AUV on a vessel, and a step 1410 of transferring the seismic data from the AUV to the vessel while on board of the vessel.

One or more of the exemplary embodiments discussed above disclose an AUV configured to perform seismic recordings. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. An autonomous underwater vehicle (AUV) for recording seismic signals during a marine seismic survey, the AUV comprising:
   a body that is configured to be selectively steered to land on the bottom of the ocean; wherein the body has a front end and a tail end, wherein a cross-sectional profile of the body is substantially uniform from the front end to the tail end, and wherein the front end and tail end have substantially similar shapes, and
   an intake water element located on the body and configured to take in water when deployed underwater;
   at least one propulsion nozzle located at the tail end of the body and configured to eject the water taken from the intake water element for propelling the AUV;
   at least one guidance nozzle located on the body and configured to eject water to change a travelling direction of the AUV; and
   a seismic payload located on the body of the AUV and arranged to record seismic signals while the AUV is resting on the bottom of the ocean.

2. The AUV of claim 1, further comprising:
   at least one propeller located in a channel connecting the intake water element to the at least one propulsion nozzle, the at least one propeller being configured to eject the water at the at least one propulsion nozzle.

3. The AUV of claim 2, further comprising:
   a motor configured to actuate the at least one propeller.

4. The AUV of claim 1, wherein a cross-section of the body has a substantially triangular shape.

5. The AUV of claim 1, wherein the seismic payload includes a hydrophone and three geophones.

6. The AUV of claim 1, further comprising:
   at least one chamber configured to be flooded to change a buoyancy of the AUV.

7. The AUV of claim 1, further comprising:
   a storage device for storing the seismic signals; and
   a communication interface configured to transmit the seismic signals to a surface vessel.

8. The AUV of claim 7, wherein the seismic signals are transferred to the recovery vessel only when the AUV is on board of the vessel.

9. The AUV of claim 1, wherein the seismic payload is configured to couple with the seabed.

10. The AUV of claim 1, wherein the AUV is configured to couple the seismic payload to the seabed.

11. The AUV of claim 1, wherein the body of the AUV has no wings.

12. The AUV of claim 1, wherein the body of the AUV has no components that substantially protrude from the body.

13. An autonomous underwater vehicle (AUV) for recording seismic signals during a marine seismic survey, the AUV comprising:
   a body that is configured to be selectively steered to land on the bottom of the ocean; wherein the body has a front end and a tail end, wherein a cross-sectional profile of the body is substantially uniform from the front end to the tail end, and wherein the front end and tail end have substantially similar shapes, and
   a propulsion system located inside the body and comprising openings on a surface of the body for receiving and ejecting water for propelling the AUV;
   a guidance system located inside the body and configured to change a direction of the front end or the tail end of the body while traveling underwater; and a seismic payload located on the body of the AUV and arranged to record seismic signals while the AUV is resting on the bottom of the ocean.

14. The AUV of claim 13, wherein a cross-section of the body has a substantially triangular shape.

15. The AUV of claim 13, wherein the propulsion system comprises:
an intake water element located on the body and configured to take in water; and at least one propulsion nozzle located at the tail end or on a side of the body and configured to eject the water from the intake water element for actuating the AUV.

16. The AUV of claim 15, further comprising:
at least one propeller located in a channel connecting the intake water element to the at least one propulsion nozzle, the at least one propeller being configured to eject the water at the at least one propulsion nozzle.

17. The AUV of claim 13, wherein the guidance system has at least one guidance nozzle located on the front end or the tail end of the body and configured to eject water to change a direction of the AUV.

18. The AUV of claim 13, wherein the seismic payload includes a hydrophone and three geophones.

19. The AUV of claim 13, further comprising:
an inertial navigation system configured to calculate a trajectory of the AUV to a desired final destination.

20. The AUV of claim 13, further comprising:
a storage device for storing the seismic signals; and
a wireless interface configured to transmit the seismic signals to a recovery vessel.

21. The AUV of claim 20, wherein the seismic signals are transferred to the recovery vessel only when the AUV is on board of the vessel.

22. The AUV of claim 13, wherein the body has no elements that extend out from the body.

23. A method for recording seismic data with an underwater autonomous vehicle (AUV), the method comprising:
providing the AUV as set forth in claim 1;
launching the AUV into water;
steering the AUV based on an inertial navigation and/or acoustic system to a desired seabed location;
recording the seismic data;
returning the AUV on a vessel; and
transferring the seismic data from the AUV to the vessel while on board of the vessel.

* * * * *